Aug. 31, 1943.  A. V. BORKEY  2,328,188
DAIRY ANIMAL RESTRAINING ARM
Filed Oct. 8, 1942

INVENTOR.
Andrew V. Borkey

Patented Aug. 31, 1943

2,328,188

UNITED STATES PATENT OFFICE 2,328,188

DAIRY ANIMAL RESTRAINING ARM

Andrew V. Borkey, Collegeville, Pa.

Application October 8, 1942, Serial No. 461,254

2 Claims. (Cl. 119—27)

This invention relates to cow stalls and stanchions in which provision is made for preserving the dairy animal in a clean condition.

It is a commonly known fact among dairymen that most animals habitually hump their backs and move forward when evacuating. This forward movement brings the animal into such a position that the evacuation usually falls on the customary stall platform instead of into the gutter and consequently soils the bedding and causes the stall to become unsanitary and messes up the cow, especially its udder.

Now it has been known that if a restraining bar is properly adjusted above the cow's back, near the shoulders, she cannot hump her back until she first backs from under it far enough to secure freedom from the restraint. This compels the animal to be near enough to the gutter so that the discharge falls therein instead of upon the platform and bedding. As a result the platform and bedding on which the animal reclines is kept clean.

A number of devices have been made for accomplishing the above purposes but such devices have been deficient in various respects and have not been entirely satisfactory. For example, the prior devices are expensive to make or maintain or are too complicated in their application.

One object of my invention is to provide an improved and greatly simplified device that is rugged and yet flexible in its application to existing stanchion equipment and may be constructed and installed in a relatively inexpensive manner so that the device will be within the reach of all dairymen but without in any way sacrificing the desirable functions of such equipment.

It is a further object to provide a device that is in itself so simple as to be conducive to maximum sanitation of the equipment as well as being attractive in appearance and harmonizing with modern dairy equipment together with allowing maximum accessibility to the animal at the forepart of its body.

A more specific object is to provide an improved device that is easily attached to metal stalls and stanchions and is readily adjustable to all sizes of dairy animals.

My invention is as nearly fool proof as possible in that its peculiar simplicity of design permits the use of a preferably tubular construction that is sufficiently rigid to resist bending and yet allows the use of a relatively simple clamping arrangement that lends sufficient flexibility and yielding of the device to upward pressure exerted by the animal, thus reducing the likelihood of injury to the animal.

Furthermore, the ease with which my improved construction permits the device to be adjusted to different heights of animals increases the probability that such adjustment, when required, will be made by the user.

The value of these features is more readily appreciated when it is considered that certain types of stanchions or yokes can be adjusted so as to place the particular animal in its stall at a point that evacuation will fall in the gutter. However when this is done, the yoke ofttimes chafes and engenders sores on the neck of the animal when it reaches forward for its fodder. This illustrates some of the difficulties involved in this general problem.

Other objects and advantages will be more apparent to those skilled in the art from the following description of the accompanying drawing in which.

Figure 1:
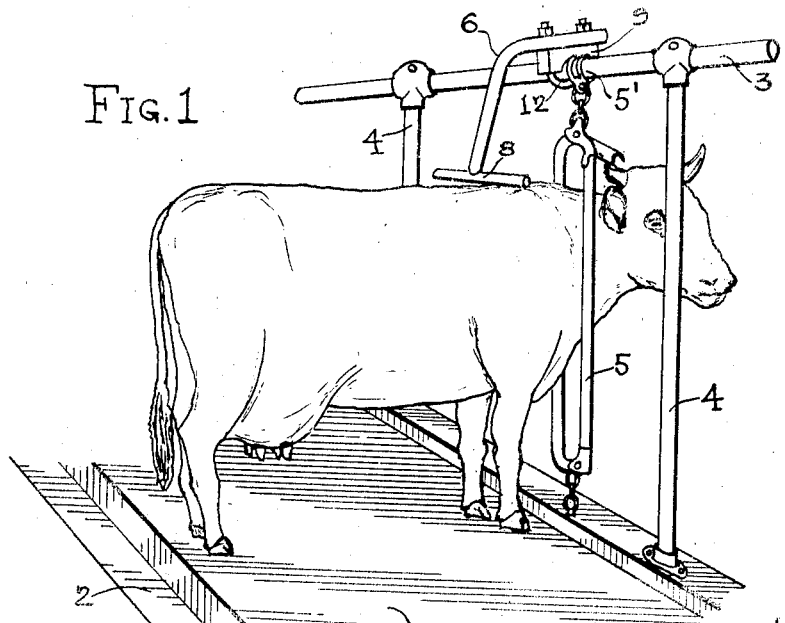
Fig. 1 is a general perspective view, showing an animal in the stall with its head secured in the stanchion or yoke and my invention in operative position, the side rails of the stall being omitted for sake of clarity.
Figure 3:
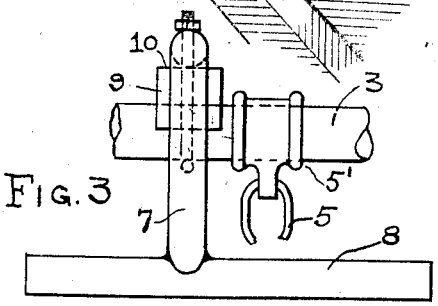
Fig. 3 is an end view of Fig. 2 looking towards the head of the animal.
Figure 2:
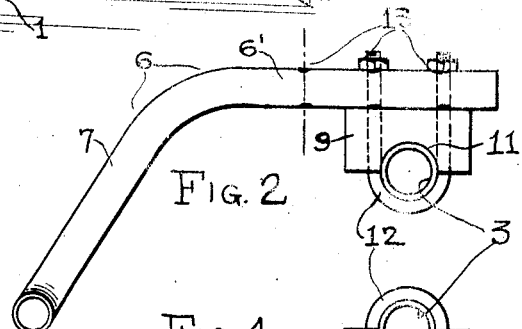
Fig. 2 is a side elevation showing the T arm clamped to the top rail of the stall.

A conventional type of modern stall is shown in Fig. 1 as comprising a floor 1, manure trough 2, and a top rail 3, this top rail being supported by vertical fixed standards 4 to which are attached the stall partition rails (not shown for purposes of clarity). Suspended from the center of the top rail 3 is one well known type of flexible stanchion 5, which is held in position by a usual clamp 5', Fig. 3, secured to the top rail. Within the stanchion the animal's head is secured, but with freedom of movement, which will allow the animal to lie down as well as have somewhat restricted movement forward and backward in the stall.

My invention contemplates the use of an extremely simple T shaped restraining arm, generally indicated at 6 and specifically consisting of a main stem having two angularly related portions 6' and 7, the portion 6' preferably being substantially horizontal and the portion 7 being inclined downwardly. Secured to the inclined portion 7 is a substantially horizontal head 8 of the T, it being noted in Fig. 3 that this head 8 is of unequal length on opposite sides of the stem 7. This inequality accomplishes the function of permitting the arm 6 to be clamped to the top rail 3 at a point slightly offset from the stanchion clamp 5' while still allowing the ends of the T head to be transversely symmetrical with respect to the stall and animal.

The foregoing offset support of the T stem on the top rail 3 permits the use of a simple direct clamping device consisting of an adapter member 9, preferably made of wood, having a flat upper surface 10 and a semi-cylindrical recess 11 to receive top rail 3. A U shaped bolt 12 passes around the rail 3 and through both the block 9 and holes in the horizontal stem portion 6'. The U bolt when tightened, firmly clamps the restraining arm in position although my improved arrangement allows the arm to be readily angularly adjusted on the cylindrical surface of the top rail 3 merely by slightly loosening the nuts of the U bolt.

My improved T arm arrangement is not only simple, rugged and direct in its operation and construction but also by virtue of the single stem maximum accessibility is provided around both the device and the animal's neck if for any reason it is desired to work upon the fore part of the animal's body while the animal is held in stanchion 5.

The single stem also functions to transmit any upward humping force from the animal substantially direct to the top rail by reason of the stem being very close to the center of the animal's back.

My arrangement also permits ease of longitudinal adjustment merely by providing any desired number of U bolt holes 13 extending through the stem portion 6'. A further advantage is that the stem 6 and its head 8 may be made, in an inexpensive manner, of pipe or other tubular material welded together at the juncture of the head and stem.

Figure 4:
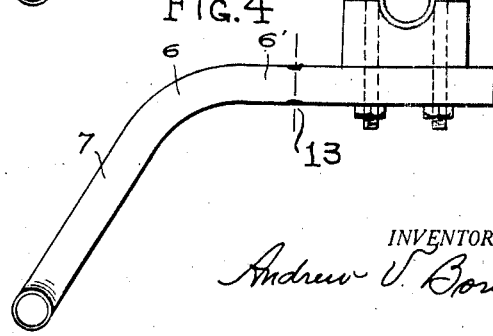
Fig. 4 is a view showing the variation in height of adjustment obtained by reversal of the clamp.

In Fig. 4 the T stem 6' and block 9 are positioned on the under side of the top rail 3. This is accomplished by merely using the parts previously described but inverting the same. When this is done the arm 6 is rotated 180° about its axis in relation to block 9.

It will be seen from the drawing and description that I have provided a device that is extremely simple in design, of few parts, readily adjustable and economical both as to amount and cost of material and the labor to manufacture and install the device, all of this being in addition to the very desirable function that the single T arm stem allows maximum accessibility around the animal's neck and head when occasion requires it.

The invention is defined in the following claims.

I claim:

1. A sanitary device for animals housed in a stall having a supporting member, comprising, a T shaped restraining arm having its stem adapted to be supported by said member and projecting in a direction so that the head of the T is substantially horizontal so as to overlie the animal's back, the head of the T arm being transversely unsymmetrical with regard to the T stem but substantially symmetrical with the animal's back.

2. A sanitary device for animals housed in a stall having a supporting member, comprising a T shaped restraining arm having its stem adapted to be supported by said member and projecting in a direction so that the head of the T is substantially horizontal so as to overlie the animal's back, the supporting member being a horizontal top rail and the stem of the T arm being supported on said rail by clamping means, said means comprising a filler block interposed between the top rail and T stem and a U bolt extending around said top rail and through the filler block and stem of the T.

ANDREW V. BORKEY.